United States Patent Office 3,318,886
Patented May 9, 1967

3,318,886
SUBSTITUTED 7 - HYDROXYMETHYL - 7,8 - DIHYDRO - 6 - AMINO - 6,14 - ENDOETHENOCODIDES AND MORPHIDES
John J. Brown, Pearl River, N.Y., Robert Allis Hardy, Jr., Ridgewood, N.J., and Carol Therese Nora, Spring Valley, N.Y., assignors to American Cyanamid Company, Stamford, Conn., a corporation of Maine
No Drawing. Filed Dec. 3, 1965, Ser. No. 511,365
10 Claims. (Cl. 260—247.5)

This application is a continuation-in-part of our co-pending application Ser. No. 473,848, filed July 21, 1965, now abandoned.

This invention relates to novel substituted 7-hydroxymethyl - 7,8 - dihydro - 6 - amino - 6,14 - endoethenocodides and morphides and to novel methods of preparing these compounds. The novel substituted 7-hydroxymethyl - 7,8 - dihydro - 6 - amino - 6,14 - endoethenomorphides and codides of the present invention may be represented by the following general formula:

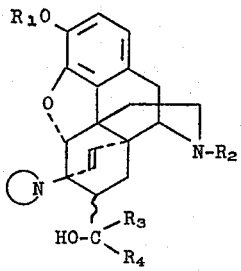

wherein $R_1$ is hydrogen, lower alkyl or lower alkanoyl; $R_2$ is hydrogen, cyano, propargyl, lower alkyl, lower aralkyl, lower alkenyl or lower cycloalkylmethyl; $R_3$ and $R_4$ are the same or different and are each hydrogen, lower alkyl, phenyl, lower cycloalkyl, or lower aralkyl; and ⟩N— is pyrrolidinyl, piperidino, morpholino or di-(lower alkyl)amino. Suitable lower alkyl and lower alkanoyl groups contemplated by the present invention are those having up to about 4 carbon atoms. Suitable lower alkenyl groups contemplated by the present invention are those having up to about 6 carbon atoms such as, for example, allyl, methallyl, dimethallyl, etc. Suitable lower cycloalkylmethyl groups contemplated by the present invention are those having from 4 to 7 carbon atoms such as, for example, cyclopropylmethyl, cyclobutylmethyl, cyclopentylmethyl, etc. Suitable lower cycloalkyl groups are those having from 3 to 6 carbon atoms such as cyclopentyl, cyclohexyl, etc. Lower aralkyl is exemplified by benzyl, β-phenylethyl, and the like.

The novel compounds of the present invention are obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form non-toxic acid-addition salts with a variety of organic and inorganic salt-forming agents. Thus, acid-addition salts, formed by admixture of the organic free base with an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases when $R_1$ in the above general formula is hydrogen. For purposes of this invention, the organic free bases are equivalent to their non-toxic acid-addition salts and their alkali metal salts.

The novel compounds of the present invention may be prepared in a number of different ways. For example, the primary carbinols (where $R_3$ and $R_4$ are both hydrogen) may be readily prepared by the reduction of an appropriately substituted 7-carbethoxy-7,8-dihydro-6-amino-6,14,-endoethenocodide or morphide with lithium aluminum hydride and the like. Additionally, a 7-formyl-7,8-dihydro-6-amino-6,14-endoethenocodide or morphide may also be reduced with lithium aluminum hydride and the like to give the same primary carbinols. This reduction may be carried out in a solvent, such as diethyl ether, at a temperature of from about 0° C. to about 65° C. over a period of time of from about 10 minutes to about 3 hours or more. The resultant primary carbinols may then be isolated by standard procedures well known to the art.

The secondary carbinols (where $R_3$ is hydrogen and $R_4$ is lower alkyl, lower cycloalkyl, phenyl or lower aralkyl) may be readily prepared by treating an appropriately substituted 7 - formyl - 7,8 - dihydro - 6 - amino - 6,14-endoethenocodide or morphide with a Grignard reagent prepared from the appropriate halide ($R_4$—X). Other organo-metal reagents such as methyl lithium, phenyl lithium, and the like ($R_4$—Li) are also useful for this conversion. This condensation may be readily carried out in a solvent, such as diethyl ether, at a temperature of from about 0° C. to about 80° C. over a period of time of from about 15 minutes to about 3 hours or more. The resultant secondary carbinol may be readily isolated by standard procedures. The secondary carbinols (where $R_3$ is hydrogen and $R_4$ is lower alkyl, lower cycloalkyl, phenyl or lower aralkyl) may also be readily prepared by the reduction of the corresponding 7-lower alkanoyl-, 7-cycloalkanoyl-, 7-benzoyl- or 7-(phenyl lower alkanoyl)-derivatives of appropriately substituted 7,8-dihydro-6-amino-6,14-endoethenomorphides or codides with lithium aluminum hydride and the like. This reduction may be readily carried out in a solvent, such as diethyl ether, at a temperature of from about 0° C. to about 65° C. over a period of time of from about 10 minutes to about 3 hours or more. These secondary carbinols may also be readily isolated by standard procedures.

The tertiary carbinols (where $R_3$ and $R_4$ are each lower alkyl, lower cycloalkyl, phenyl or lower aralkyl) may be readily prepared by treating a 7-(lower alkanoyl)-, 7-cycloalkanoyl-, 7-benzoyl- or 7-(phenyl lower alkanoyl)-derivative of an appropriately substituted 7,8-dihydro-6-amino-6,14-endoethenomorphide or codide with a Grignard reagent prepared from the appropriate halide ($R_3$—X). Other organo-metal reagents such as methyl lithium, phenyl lithium, and the like ($R_3$—Li) are also useful for this conversion. This reaction may be readily carried out in a solvent, such as diethyl ether, at a temperature of from about 0° C. to about 80° C. over a period of time of from about 15 minutes to about 3 hours or more. These tertiary carbinols may be readily isolated by standard procedures well known to the art. Additionally, symmetrically substituted teritary carbinols (where $R_3=R_4$) may be obtained by treating a 7-(lower carboalkoxy)- or 7-carbo(phenyl lower alkyl)oxy-derivative of an appropriately substituted 7,8-dihydro-6-amino-6,14-endoethenocodide ormorphide with a suitable organo-metal reagent ($R_3MgX$ or $R_3$—Li).

The necessary intermediates for the preparation of the novel compounds of the present invention may be readily synthesized from an appropriately substituted codeinone or morphinone and are transformed to the compounds of this invention in accordance with the following reaction scheme:

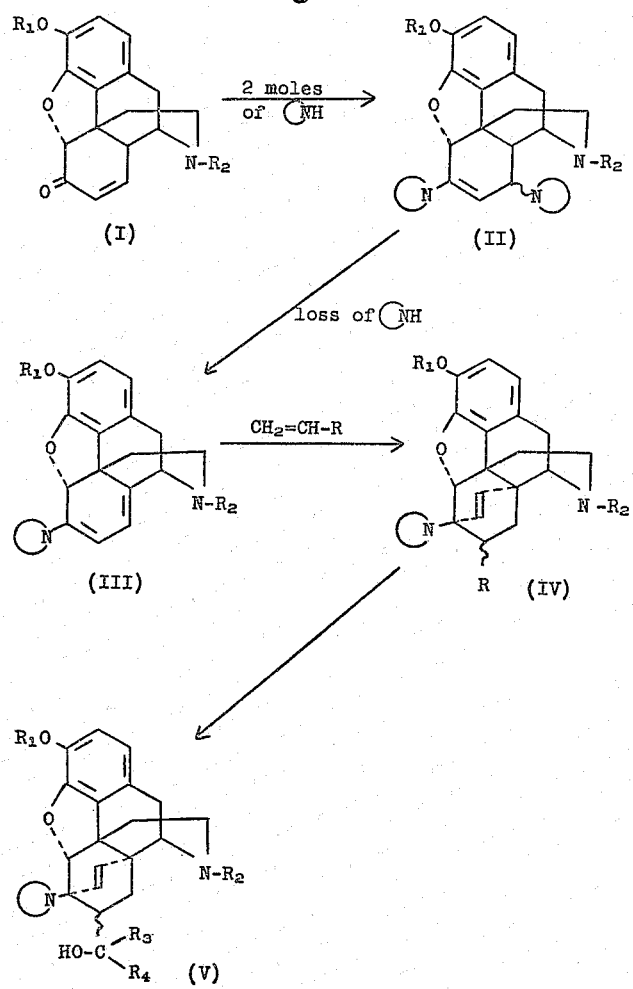

wherein $R_1$, $R_2$, $R_3$, $R_4$ and ⓃH are as hereinabove defined and R is cyano, formyl, lower alkanoyl, lower cycloalkanoyl, benzoyl, lower carboalkoxy or carbo(phenyl lower alkyl)oxy. In accordance with this reaction scheme, treatment of an appropriately substituted codeinone or morphinone (I) with a secondary amine ⓃH furnishes the 6,8-bis-amino intermediates (II), which optionally may be isolated and purified or used without purification. These 6,8-bis-amino derivatives (II) are then converted to the dienamines (III), whose isolation is also optional, which are further allowed to react with dienophiles ($CH_2$=CH—R) producing the 7-substituted intermediates (IV). The novel 6-amino-6,14-endoethenocodides and morphides of this invention (V) are obtained from these derivatives (IV) as described in detail hereinabove.

The conversion of the substituted codeinone or morphinone derivatives (I) to the intermediate 6,8-bis-(tertiary amino) derivatives (II) may be conveniently carried out in a lower alkanol solvent, such as methanol, ethanol, isopropanol, n-butanol, etc. at a temperature of from about 25° C. to about 150° C. However, the refluxing temperature of the solvent, such as methanol or ethanol, is the preferred temperature in order to insure a substantially complete reaction. The conversion of the 6,8-bis-(tertiary amino) derivatives (II) to the dienamines (III) is best carried out by heating the intermediates (II) in an inert solvent such as benzene, toluene, and the like at a temperature of from about 80° C. to about 150° C. until the reaction is substantially complete (usually one to several hours). The dienamine product is promptly separated from the reaction mixture by standard methods well known in the art.

Addition of the dienophile ($CH_2$=CH—R) to the dienamine (III) proceeds readily whereby there is obtained the corresponding 7 - substituted - 7,8 - dihydro - 6-amino-6,14-endoethenocodide or morphide (IV) This conversion is conveniently carried out in an organic solvent such as benzene or in an excess of the dienophile reagent as the solvent. This reaction may be carried out at a temperature of from about 50° C. to about 150° C. However, the refluxing temperature of the solvent is the preferred temperature in order to insure a substantially complete reaction which usually requires from about 1 to about 24 hours. The corresponding 7-substituted-7,8-dihydro - 6 - amino - 6,14 - endoethenocodide or morphide (III) thus obtained is readily isolated from the reaction mixture and may be purified by recrystallization from solvents such as ethanol, acetone and the like.

In addition to the above described general preparative schemes for the novel compounds of the present invention, they may also be obtained by transformations of the 3-substituent ($R_1$; Formula V), and/or by transformations of the N-substituent ($R_2$; Formula V). For example, 3-methoxy derivatives (codide series) may be transformed to 3-hydroxy derivatives (morphide series) by heating with potassium hydroxide in diethylene glycol. 3-acetyl-morphides are obtained upon treatment of the 3-hydroxy derivatives (morphides) with acetic anhydride and the like using procedures well known to those skilled in the art.

Transformations of the N-substituent ($R_2$; Formula V) are also useful methods for the compounds of this invention, and for certain examples are the preferred method of synthesis; these transformations are, therefore, included within the purview of the present invention. The N-methyl derivatives (codides and morphides; $R_2$=$CH_3$, Formula V) may be treated with cyanogen halides using procedures well known to those skilled in the art. N-cyano derivatives ($R_2$=CN, Formula V) within the scope of this invention are thereby obtained. Hydrolysis of the N-cyano derivatives by heating with potassium hydroxide in diethylene glycol may then be employed to produce norcodides and normorphides ($R_2$=H; Formula V). These norcodides and normorphides containing the secondary amine moiety are then re-alkylated with a suitable alkyl, cycloalkylmethyl, phenyl lower alkyl or propargyl halide or equivalent using procedures well known to those skilled in the art. Suitable alkylating agents include ethyl iodide, propargyl tosylate, benzyl chloride, phenethyl bromide, allyl bromide, methallyl bromide, dimethallyl bromide and the like. N-cycloalkylmethyl derivatives are conveniently obtained from the nor compounds by acylation with cycloalkanecarbonyl halides followed by reduction with lithium aluminum hydride. Suitable reactants are cyclopropanecarbonyl chloride, cyclobutanecarbonyl bromide, and the like.

The novel compounds of the present invention are active analgesics when measured by the rat tail-flick method described by F. E. D'Amour and D. L. Smith [J. Pharmacol. Exptl. Therap., vol. 72, p. 74 (1941)], with modifications.

The compounds (generally as hydrochloride salts in 0.9% saline) are administered subcutaneously to groups of 5 rats. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100% increase in response time over controls. Established clinically active analgesics such as meperidine, codeine, morphine, etc., are active in the above test. When tested by this procedure at 25 mg./kg., 7-hydroxymethyl-7,8-dihydro-6-(1-pyrrolidinyl)-6,14-endoethenocodide shows morphine-like analgesic activity.

When mixed with suitable excipients or diluents, the compounds of this invention can be prepared as pills, capsules, tablets, powders, solutions, suspensions and the like for unit dosage, and to simplify administration. As analgesics they will relieve pain by direct action on the nerve centers or by diminishing the conductivity of the sensory nerve fibers. The novel compounds of the present invention may also be administered in combination therapy with salicylates such as aspirin and the like.

The novel compounds of this invention may exist in several isomeric forms such as stereoisomers. It is to be understood that the present invention includes within its scope all such isomeric forms. For example, the codeinones and morphinones used as starting materials have several asymmetric carbon atoms, and addition of the dienophile ($CH_2$=CH—R) forms a new asymmetric center (at C–7). Formation of stereoisomers, or epimers, at C–7 is sometimes evident in the isolation and purification of either the intermediates (Formula IV) or the novel compounds of this invention (Formula V) derived therefrom. The nuclear magnetic resonance spectra of these 7 - substituted - 7,8-dihydro-6-amino-6,14-endoethenocodides and morphides are patricularly helpful in characterizing the mixtures of epimers or the substantially pure stereoisomers as obtained from the reaction mixtures or from subsequent purifications and separations. In addition to epimers at C–7, the compounds of the present invention may contain an additional asymmetric center. For example, when $R_3$ and $R_4$ are different groups, the carbinol carbon atom is an asymmetric center, and additional stereoisomers are possible. In this case, diastereoisomers at the asymmetric tert-carbinol carbon may be formed during the general synthesis of tertiary carbinols with organo-metal reagents as outlined hereinabove; these isomers may then be separated by methods (such as fractional crystallization and partition-chromatography) well known to those skilled in the art. Alternately, these diastereoisomers are obtained, frequently in a substantially pure state, by inverting the order in which the $R_3$ and $R_4$ substituents are attached to the asymmetric center formed by the organo-metal reagent. This follows the principle of steric control induced by the asymmetry of the starting material. A total of 4 stereoisomers may thus be obtained due to the epimeric center at C–7 and an asymmetric carbinol. All such stereoisomeric forms of the 7-hydroxymethyl-7,8-dihydro-6-amino-6,14-endoethenocodides and morphides are, therefore, included within the purview of this invention.

The invention will be described in greater detail in conjunction with the following specific examples.

EXAMPLE 1

*Preparation of 7-hydroxymethyl-7,8-dihydro-6-(1-pyrrolidinyl)-6,14-endoethenocodide*

7α - carbethoxy - 7,8-dihydro-6-(1-pyrrolidinyl)-6,14-endoethenocodide (1 g.) is added to a suspension of 1 g. of lithium aluminum hydride in 100 ml. of ether with stirring. The reaction mixture is stirred at room temperature for about 2 hours, and is then treated with a saturated solution of aqueous potassium sodium tartrate. The ether layer is separated, the residue is washed with ether and methylene chloride, and the combined organic extracts are dried and evaporated. The crude product, 7-hydroxymethyl - 7,8 - dihydro - 6-(1-pyrrolidinyl)-6,14-endoethenocodide is thereby obtained as a crystalline residue (646 mg., M.P. 150–157° C.). This crude product is then purified by collection with ether followed by crystallization from methanol, and substantially pure 7α-hydroxymethyl-7,8-dihydro - 6 - (1 - pyrrolidinyl) - 6,14-endoethenocodide, M.P. 162–165° C. is obtained.

EXAMPLE 2

*Preparation of 7-(α-hydroxybenzyl)-7,8-dihydro-6-(1-pyrrolidinyl)-6,14-endoethenocodide*

7 - benzoyl - 7,8-dihydro-6-(1-pyrrolidinyl)-6,14-endoethenocodide (500 mg.) is added to a suspension of lithium aluminum hydride (500 mg.) in ether (50 ml.) with stirring. The reaction mixture is stirred at room temperature for about two hours, and is then treated with a saturated solution of aqueous potassium sodium tartrate. The ether layer is separated, the residue is washed with ether and methylene chloride, and the combined organic extracts are dried and evaporated. The resulting oil is crystallized and collected with the aid of ether to give 7-(α-hydroxybenzyl)-7,8-dihydro-6-(1-pyrrolidinyl)-6,14-endoethenocodide (238 mg., M.P. 189–204° C.). Recrystallization from acetone-n-hexane gives a purified product, M.P. 196–215° C.

When the crude product, obtained in the above manner, is recrystallized from methanol the melting point is 195–199° C., and the nuclear magnetic resonance spectrum indicates it contains a mixture of stereoisomers.

EXAMPLE 3

*Preparation of 7-(α-hydroxy-α-methylbenzyl)-7,8-dihydro-6-(1-pyrrolidinyl)-6,14-endoethenocodide*

Lithium (500 mg.) is added in small pieces to a stirred mixture of 7-benzoyl-7,8-dihydro-6-(1-pyrrolidinyl)-6,14-endoethenocodide (500 mg.), ether (50 ml.), and methyl iodide (12.5 ml.). The reaction is complete after 30 minutes, and water is added cautiously to decompose the mixture. The ether layer is washed with water and dried over sodium sulfate; the residue obtained by evaporation is dissolved in acetone and water is added to precipitate the product. The mixture is stirred for 1 hour and the crude product (400 mg.), melting point 100–125° C. is collected and dried.

The crude product, obtained as an amorphous solid in the above manner, is purified by repeating the above precipitation procedure. The substantially pure stereoisomer 7α-[α(R)-α-hydroxy-α-methylbenzyl]-6-(1-pyrolidinyl)-6,14-endoethenocodide is thereby obtained.

EXAMPLE 4

*Preparation of 7-(1-hydroxy-1-methylbutyl)-7,8-dihydro-6-(1-pyrrolidinyl)-6,14-endoethenocodide*

Lithium (140 mg.) is added to a solution of 7α-acetyl-7,8 - dihydro - 6-(1-pyrrolidinyl)-6,14-endoethenocodide (140 mg.) and propyl iodide (3.7 ml.) in ether (14 ml.) with stirring. The mixture is heated on the steam bath until the reaction starts and is then stirred at room temperature for about 16 hours. Water is added slowly to decompose the mixture. The mixture is extracted with ether, and the ether extracts are washed with water, dried, and evaporated. The residue is dissolved in methylene chloride, and the solution is treated with charcoal, and evaporated. The residue is dissolved in 5% HCl (5 ml.) and the solution is filtered from an insoluble oil, neutralized with aqueous sodium bicarbonate, and the white precipitate that forms is filtered off and dried to give 59 mg. of crude product which melts with decomposition at about 80° C. The crude reaction product is then purified by chromatographic techniques.

EXAMPLE 5

*Preparation of 7-(1-hydroxy-1-methylethyl)-7,8-dihydro-6-(1-pyrrolidinyl)-6,14-endoethenocodide*

Lithium (200 mg.) is added to a solution of 7α-acetyl-7,8 - dihydro - 6-(1-pyrrolidinyl)-6,14-endoethenocodide (200 mg.) and methyl iodide (5 ml.) in ether (20 ml.) with stirring. The reaction starts immediately and is stirred at room temperature for about 55 minutes. Water is added slowly to decompose the mixture. The mixture is extracted with ether, and the ether extracts are washed with water, dried, and evaporated, giving an oil which is crystallized by trituration with ether. Collection with n-hexane gives 7-(1-hydroxy-1-methylethyl)-7,8-dihydro-6 - (1 - pyrrolidonyl)-6,14-endoethenocodide (117 mg.), M.P. 184–186° C.

EXAMPLE 6

*Preparation of 7-(1-hydroxy-1-methylethyl)-7,8-dihydro-6-(1-pyrrolidinyl)-6,14-endoethenocodide*

Lithium (2 g.) is added in small pieces to a stirred solution of 7α-carbethoxy-7,8-dihydro-6-(1-pyrrolidinyl)-6,14-endoethenocodide (2.05 g.) in ether (200 ml.) and methyl iodide (50 ml.). After the addition is complete, the mixture is stirred for an additional 30 minutes during which time the lithium has all reacted. The mixture is decomposed with water, and the ether layer is washed with water and dried. The gum obtained by evaporation of the solvent is crystallized from n-hexane to give 7α-(1 - hydroxy - 1 - methylethyl)-7,8-dihydro-6-(1-pyrrolidinyl)-6,14-endoethenocodide (1.51 g.), M.P. 190–192° C.

EXAMPLE 7

*Preparation of 7-(1-hydroxy-1-methylethyl)-7,8-dihydro-6-(1-pyrrolidinyl)-6,14-endoethenomorphide*

7α - (1 - hydroxy - 1 - methylethyl) - 7,8 - dihydro - 6- (1 - pyrrolidinyl) - 6,14 - endoethenocodide (100 mg.) is added to a stirred solution of potassium hydroxide (400 mg.) in diethylene glycol (2 ml.) at 210–215° C. After one hour the cooled mixture is poured into water and the mixture is extracted with ether. The aqueous phase is treated with an excess of saturated aqueous ammonium chloride, and the mixture is extracted with chloroform. The extract is washed with water and dried over anhydrous sodium sulfate. The residue obtained by evaporation of the solvent is crystallized from acetone-n-hexane to give 7α-(1-hydroxy-1-methylethyl)-7,8-dihydro-6-(1-pyrrolidinyl)-6,14-endoethenomorphide (30 mg.), M.P. 270–271° C. dec. The pure compound has M.P. 273–274° C. dec. obtained by further crystallization from acetone-n-hexane.

EXAMPLE 8

*Preparation of N-cyano-7-(1-hydroxy-1-methylethyl)-7,8-dihydro-6-(1-pyrrolidinyl)-6,14-endoethenonorcodide*

A solution of cyanogen bromide (100 mg.) in chloroform (2.5 ml.) is dried over anhydrous sodium sulfate and is then filtered, chloroform (2.5 ml.) being used for washing the residue. 7,8-dihydro-7α-(1-hydroxy-1-methylethyl)-6-(1-pyrrolidinyl)-6,14-endoethenocodide (200 mg.) is then added and the mixture is heated under reflux for 24 hours. Methylene chloride is added, and the mixture is washed with water and dried over anhydrous sodium sulfate. The residue obtained by evaporation of the solvent is crystallized from acetone-n-hexane to give N-cyano-7α-(1-hydroxy-1-methylethyl)-7,8-dihydro-6-(1-pyrrolidinyl)-6,14-endoethenonorcodide (100 mg.), M.P. 214–218° C. The purified compound has M.P. 216–217° C. when recrystallized from the same solvent.

EXAMPLE 9

*Preparation of 7,8-dihydro-7-(1-hydroxy-1-ethyl)-6-(1-pyrrolidinyl)-6,14-endoethenocodide*

Lithium (200 mg.) is added in small pieces to a stirred solution of 7α-formyl-7,8-dihydro-6-(1-pyrrolidinyl)-6,14-endoethenocodide (200 mg.) in ether (20 ml.) and methyl iodide (5 ml.). After 30 minutes the lithium has all dissolved and water is added cautiously to the mixture. The ethereal layer is washed with water and dried over anhydrous sodium sulfate. Evaporation gives a gum which is crystallized from n-hexane to give 7,8-dihydro-7-(1-hydroxy - 1 - ethyl) - 6 - (1 - pyrrolidinyl) - 6,14 - endoethenocodide (120 mg.), M.P. 170–174° C.

EXAMPLE 10

*Preparation of 7-hydroxymethyl-7,8-dihydro-6-(1-pyrrolidinyl)-6,14-endoethenocodide*

By following the procedure of Example 1 except that an equivalent amount of 7-formyl-7,8-dihydro-6-(1-pyrrolidinyl)-6,14-endoethenocodide is used in place of the 7 - carbethoxy - 7,8 - dihydro - 6 - (1 - pyrrolindyl) - 6,14-endothenocodide of that example, there is obtained 7-hydroxymethyl - 7,8 - dihydro - 6 - (1 - pyrrolidinyl) - 6,14-endoethenocodide.

EXAMPLE 11

*Preparation of 7-hydroxymethyl-7,8-dihydro-6-(1-pyrrolidinyl)-6,14-endoethenomorphide*

The general procedure of Example 1 is repeated. 7-carbethoxy - 7,8 - dihydro - 6 - (1 - pyrrolidinyl) - 6,14-endoethenomorphide is reduced with lithium aluminum hydride, the product is isolated, and 7-hydroxymethyl-7,8 - dihydro - 6 - (1 - pyrrolidinyl) - 6,14 - endoethenomorphide is thereby obtained.

EXAMPLE 12

*Preparation of N-allyl-7-(1-hydroxyethyl)-7,8-dihydro-6-(1-pyrrolidinyl)-6,14-endoethenonorcodide*

By following the procedure of Example 1 except that an equivalent amount of 7-acetyl-N-allyl-7,8-dihydro-6-(1-pyrrolidinyl)-6,14-endoethenonorcodide is used in place of the 7-carbethoxy-7,8-dihydro-6-(1-pyrrolidinyl)-6,14-endoethenocodide of that example, there is obtained N - allyl - 7 - (1 - hydroxyethyl) - 7,8 - dihydro - 6 - (1-pyrrolidinyl)-6,14-endoethenonorcodide.

EXAMPLE 13

*Preparation of 7-(1-cyclohexyl-1-hydroxyethyl)-7,8-dihydro-6-(1-pyrrolidinyl)-6,14-endoethenocodide*

The general procedure of Example 5 is repeated. 7-cyclohexanecarbonyl - 7,8 - dihydro - 6 - (1 - pyrrolidinyl)-6,14-endoethenocodide is reacted with methyl lithium, the product is isolated, and 7-(1-cyclohexyl-1-hydroxyethyl) - 7,8 - dihydro - 6 - (1-pyrrolidinyl) - 6,14-endothenocodide is thereby obtained.

EXAMPLE 14

*Preparation of 7-(α-ethyl-α-hydroxybenzyl)-7,8-dihydro-6-(1-pyrrolidinyl)-6,14-endoethenomorphide*

The general procedure of Example 3 is repeated. 7-benzoyl-7,8-dihydro-6-(1-pyrrolidinyl)-6,14-endoethenomorphide is reacted with ethyl lithium, the product is isolated, and 7-(α-ethyl-α-hydroxybenzyl)-7,8-dihydro-6-(1-pyrrolidinyl)-6,14-endoethenomorphide is thereby obtained.

EXAMPLE 15

*Preparation of 7-(1-hydroxy-1-methylpropyl)-7,8-dihydro-6-(1-pyrrolidinyl)-6,14-endoethenomorphide*

The general procedure of Example 5 is repeated. 7-acetyl-7,8-dihydro-6-(1-pyrrolidinyl)-6,14-endoethenomorphide is reacted with ethyl lithium, the product is isolated, and 7-(1-hydroxy-1-methylpropyl)-7,8-dihydro-6-(1-pyrrolidinyl)-6,14-endoethenomorphide is thereby obtained.

EXAMPLE 16

*Preparation of N-allyl-7-(1-hydroxy-1-methylbutyl)-7,8-dihydro-6-(1-pyrrolidinyl)-6,14-endoethenonorcodide*

The general procedure of Example 4 is repeated. 7-acetyl-N-allyl-7,8-dihydro-6-(1-pyrrolidinyl)-6,14-endoethenonorcodide is reacted with propyl lithium, the product is isolated, and N-allyl-7-(1-hydroxy-1-methylbutyl)-7,8-dihydro-6-(1-pyrrolidinyl)-6,14-endoethenonorcodide is thereby obtained.

EXAMPLE 17

*Preparation of N-cyclopropylmethyl-7-(1-hydroxy-1-methylethyl)-7,8-dihydro-6-(1-pyrrolidinyl)-6,14-endoethenonorcodide*

By following the procedure of Example 5 except that an equivalent amount of 7-acetyl-N-cyclopropylmethyl-7,8-dihydro-6-(1-pyrrolidinyl)-6,14-endoethenonorcodide is used in place of the 7-acetyl-7,8-dihydro-6-(1-pyrrolidinyl)-6,14-endoethenocodide of that example, there is obtained N-cyclopropylmethyl-7-(1-hydroxy-1-methylethyl)-7,8-dihydro-6-(1-pyrrolidinyl)-6,14-endoethenonorcodide.

EXAMPLE 18

*Preparation of N-cyclopropylmethyl-7-(1-hydroxy-1-methylethyl)-7,8-dihydro-6-(1-pyrrolidinyl)-6,14-endoethenonormorphide*

By heating N-cyclopropylmethyl-7-(1-hydroxy-1-methylethyl)-7,8-dihydro-6-(1-pyrrolidinyl)-6,14-endoethenonorcodide with a mixture of potassium hydroxide and diethylene glycol at about 200–220° C., following the procedure of Example 7, N-cyclopropylmethyl-7-(1-hydroxy-1-methylethyl)-7,8-dihydro-6-(1-pyrrolidinyl)-6,14-endoethenonormorphide is thereby obtained.

EXAMPLE 19

*Preparation of N-allyl-7-(1-hydroxy-1-methylethyl)-7,8-dihydro-6-(1-pyrrolidinyl)-6,14-endoethenonormorphide*

By heating N-allyl-7-(1-hydroxy-1-methylethyl)-7,8-dihydro-6-(1-pyrrolidinyl)-6,14-endoethenonorcodide with a mixture of potassium hydroxide and diethylene glycol at about 200–220° C., following the procedure of Example 7, N-allyl-7-(1-hydroxy-1-methylethyl)-7,8-dihydro-6-(1-pyrrolidinyl)-6,14-endoethenonormorphide is thereby obtained.

EXAMPLE 20

*Preparation of 7-(1-hydroxy-1-methylbutyl)-7,8-dihydro-6-(1-pyrrolidinyl)-6,14-endoethenomorphide*

By heating 7-(1-hydroxy-1-methylbutyl)-7,8-dihydro-6-(1-pyrrolidinyl)-6,14-endoethenocodide with a mixture of potassium hydroxide and diethylene glycol at about 200–220° C., following the procedure of Example 7, 7-(1-hydroxy-1-methylbutyl)-7,8-dihydro-6-(1-pyrrolidinyl)-6,14-endothenomorphide is thereby obtained.

EXAMPLE 21

*Preparation of N-cyano-7-(1-hydroxy-1-methylethyl)-7,8-dihydro-6-(1-pyrrolidinyl)6,14-endoethenonorcodide*

The general procedure of Example 5 is repeated. By treatment of 7-acetyl-N-cyano-7,8-dihydro-6-(1-pyrrolidinyl)-6,14-endoethenonorcodide with methyl lithium, followed by isolation of the product, N-cyano-7-(1-hydroxy-1-methylethyl)-7,8-dihydro-6-(1-pyrrolidinyl)-6,14-endoethenonorcodide is thereby obtained.

EXAMPLE 22

*Preparation of 7-(1-hydroxy-1-methylethyl)-7,8-dihydro-6-(1-pyrrolidinyl)-6,14-endoethenonorcodide*

By heating N-cyano-7-(1-hydroxy-1-methylethyl)-7,8-dihydro-6-(1-pyrrolidinyl)-6,14-endoethenonorcodide with a mixture of potassium hydroxide and diethylene glycol at about 180°–200° C., 7-(1-hydroxy-1-methylethyl)-7,8-dihydro-6-(1-pyrrolidinyl)-6,14-endoethenonorcodide is thereby obtained.

EXAMPLE 23

*Preparation of N-allyl-7-(1-hydroxy-1-methylethyl)-7,8-dihydro-6-(1-pyrrolidinyl)-6,14-endoethenonorcodide*

By reacting 7-(1-hydroxy-1-methylethyl)-7,8-dihydro-6-(1-pyrrolidinyl)-6,14-endoethenonorcodide with allyl chloride in an inert solvent, N-allyl-7-(1-hydroxy-1-methylethyl)-7,8-dihydro-6-(1-pyrrolidinyl)-6,14-endoethenonorcodide is thereby obtained.

EXAMPLE 24

*Preparation of 7-(1-hydroxy-1-methylethyl)-7,8-dihydro-N-(3-methyl-2-buten-1-yl)-6-(1-pyrrolidinyl)-6,14-endoethenonorcodide*

The procedure of Example 23 is repated. By reacting 7-(1-hydroxy-1-methylethyl)-7,8-dihydro-6-(1-pyrrolidinyl)-6,14-endoethenonorcodide with 3-methyl-2-buten-1-yl bromide, 7-(1-hydroxy-1-methylethyl)-7,8-dihydro-N-(3-methyl-2-buten-1-yl)-6-(1-pyrrolidenyl)-6,14-endoethenonorcodide is thereby obtained.

EXAMPLE 25

*Preparation of N-cyclopropylmethyl-7-(1-hydroxy-1-methylethyl)-7,8-dihydro-6-(1-pyrrolidinyl)-6,14-endoethenonorcodide*

By N-acylation of 7-(1-hydroxy-1-methylethyl)-7,8-dihydro-6-(1-pyrrolidinyl)-6,14-endoethenonorcodide with cyclopropanecarbonyl chloride followed by reduction with lithium aluminum hydride there is obtained N-cyclopropylmethyl-7-(1-hydroxy-1-methylethyl)-7,8-dihydro-6-(1-pyrrolidinyl)-6,14-endoethenonorcodide.

EXAMPLE 26

*Preparation of N-cyclobutylmethyl-7-(1-hydroxy-1-methylethyl)-7,8-dihydro-6-(1-pyrrolidinyl)-6,14-endoethenonorcodide*

The procedure of Example 25 is repeated. By treatment of 7-(1-hydroxy-1-methylethyl)-7,8-dihydro-6-(1-pyrrolidinyl)-6,14-endoethenonorcodide with cyclobutanecarbonyl chloride followed by reduction with lithium aluminum hydride there is obtained N-cyclobutylmethyl-7-(1-hydroxy-1-methylethyl)-7,8-dihydro-6-(1-pyrrolidinyl)-6,14-endoethenonorcodide.

EXAMPLE 27

*Preparation of 3-acetyl-7-(1-hydroxy-1-methylethyl)-7,8-dihydro-6-(1-pyrrolidinyl)-6,14-endoethenomorphide*

By treatment of 7-(1-hydroxy-1-methylethyl)-7,8-dihydro-6-(1-pyrrolidinyl)-6,14-endoethenomorphide with acetice anhydride in an inert solvent, 3-acetyl-7-(1-hydroxy-1-methylethyl)-7,8-dihydro-6-(1-pyrrolidinyl)-6,14-endoethenomorphide is thereby obtained.

EXAMPLE 28

*Preparation of 3-acetyl-N-cyclopropylmethyl-7 - (1-hydroxy-1-methylethyl) - 7,8-dihydro-6-(1-pyrrolidinyl)-6,14-endoethenonormorphide*

The procedure of Example 27 is repeated. By treatment of N-cyclopropymethyl - 7 - (1-hydroxy-1-methylethyl) - 7,8-dihydro - 6 - (1-pyrrolidinyl) - 6,14-endoethenonormorphide with acetic anhydride there is obtained 3-acetyl-N-cyclopropylmethyl - 7 - (1-hydroxy-1-methylethyl) - 7,8-dihydro-6 - (1-pyrrolidinyl)-6,14-endoethenonormorphide.

EXAMPLE 29

*Preparation of 7-(1-hydroxy-1-methylethyl)-7,8-dihydro-6-morpholino-6,14-endoethenocodide*

The general procedure of Example 6 is repeated. By treatment of 7 - carbethoxy - 7,8-dihydro-6-morpholino-6,14-endoethenocodide with methyl lithium, followed by isolation of the product, 7-(1-hydroxy-1-methylethyl)-7,8-dihydro-6-morpholino-6,14-endoethenocodide is thereby obtained.

EXAMPLE 30

*Preparation of 7-(1-hydroxy-1-methylethyl)-7,8-dihydro-6-piperidino-6,14-endoethenocodide*

The general procedure of Example 6 is repeated. By treatment of 7-carbethoxy - 7,8-dihydro-6-piperidino-6,14-endoethenocodide with methyl lithium, followed by isolation of the product, 7 - (1-hydroxy-1-methylethyl)-7,8-dihydro-6-piperidino-6,14-endoethenocodide is thereby obtained.

EXAMPLE 31

*Preparation of 7-(1-hydroxy-1-methylethyl)-7,8-dihydro-6-dimethylamino-6,14-endoethenocodide*

The general procedure of Example 6 is repeated. By treatment of 7-carbethoxy-7,8-dihydro-6-dimethylamino-6,14-endoethenocodide with methyl lithium, followed by isolation of the product, 7-(1-hydroxy-1-methylethyl)-7,8 - dihydro-6-dimethylamino - 6,14-endoethenocodide is thereby obtained.

EXAMPLE 32

*Preparation of 7-(1-hydroxy-1-methylethyl)-7,8-dihydro-6-morpholino-6,14-endoethenomorphide*

By heating - (1-hydroxy - 1 - methylethyl-7,8-dihydro-6-morpholino-6,14-endoethenocodide with a mixture of potassium hydroxide and diethylene glycol at about 200–220° C., following the procedure of Example 7, 7-(1-hydroxy-1-methylethyl) - 7,8-dihydro - 6 - morpholino-6,14-endoethenomorphide is thereby obtained.

EXAMPLE 33

*Preparation of 7-cyano-7,8-dihydro-6-(1-pyrrolidinyl)-6,14-endoethenocodide*

6,8 - bis - (1-pyrrolidinyl)-$\Delta^6$-codide methanolate (200 mg.) and acrylonitrile (5 ml.) are heated under reflux for two hours. The solvent is then evaporated and the residue is crystallized from acetone-n-hexane to give 7-cyano-7,8-dihydro - 6 - (1-pyrrolidinyl)-6,14-endoethenocodide (125 mg.), M.P. 197–200° C. dec. This product is a mixture of epimers, as indicated by the nuclear magnetic resonance spectrum. By partition chromatography this mixture is separated, giving the C–7 endo ($\alpha$)- and exo ($\beta$)-isomers in substantially pure form. These purified isomers melt at 201–202° C. dec. and 205–207° C. dec., respectively.

EXAMPLE 34

*Preparation of 7-cyano-7,8-dihydro-6-(1-pyrrolidinyl)-6,14-endoethenocodide*

6-demethoxy - 6 - (1-pyrrolidinyl)thebaine (ca. 80 mg. obtained as oil by the procedure of Example 54 and used without further purification) and acrylonitrile (5 ml.) are heated under reflux for two hours. The solvent is then evaporated and the residue is crystallized from acetone-n-hexane to give 7-cyano-7,8-dihydro-6-(1-pyrrolidinyl)-6,14-endoethenocodide (64 mg.), M.P. 195–199° C. dec., as a mixture of C–7 epimers.

EXAMPLE 35

*Preparation of 7-formyl-7,8-dihydro-6-(1-pyrrolidinyl)-6,14-endoethenocodide*

Acrolein (0.15 ml.) is added to a solution of 6,8-bis-(1-pyrrolidinyl) - $\Delta^6$-codide methanolate (100 mg.) in anhydrous benzene (4 ml.) and the reaction mixture is heated under reflux for two hours. The resulting solution is evaporated under reduced pressure, and the residue is collected with n-hexane to give crude product (53 mg., 46%), M.P. 150–155° C. Recrystallization from acetone-n-hexane gives purified 7$\alpha$-formyl-7,8-dihydro-6-(1-pyrrolidinyl)-6,14-endoethenocodide which melts at 165–167° C.

EXAMPLE 36

*Preparation of 7-formyl-7,8-dihydro-6-(1-pyrrolidinyl)-6,14-endoethenocodide*

A solution of acrolein (1 ml.) in anhydrous benzene (35 ml.) is added dropwise with stirring to a solution of 6-demethoxy-6-(1-pyrrolidinyl)thebaine (ca. 1.7 g.) in anhydrous benzene under nitrogen. The resulting solution is heated under reflux for one hour, the solvent is evaporated, and the residue is collected with n-hexane to give crude product (1.6 g., 90%), M.P. 155–158° C. Recrystallization from methylene chloride-n-hexane (charcoal) gives purified 7$\alpha$-formyl-7,8-dihydro-6-(1-pyrrolidinyl)-6,14-endoethenocodide, M.P. 165–167° C.

EXAMPLE 37

*Preparation of 7-carbethoxy-7,8-dihydro-6-(1-pyrrolidinyl)6,14-endoethenocodide*

6.8-bis-(1-pyrrolidinyl)-$\Delta^6$-codide methanolate (200 mg.) and ethyl acrylate (5 ml.) are heated on the steambath for 2 hours. The solvent is then removed by evaporation, the residual gum is dissolved in n-hexane and the solution is treated with charcoal and filtered. The residual gum, obtained by evaporation of the solvent, is dissolved in dilute hydrochloric acid (5 ml.; 5%) and the crude product (as the free base) precipitated by the addition of aqueous sodium bicarbonate solution. The product is collected, washed with water, and dried. This base (160 mg.), melting point 57–60° C., in acetone (2 ml.) is treated with an excess of ethanolic hydrochloric acid (1.5 N). The hydrochloride starts to separate and ether is added to complete the separation. The hydrochloride is collected, washed with ether, and dried. Crystallization from methanol-acetone gives purified 7$\alpha$-carbethoxy-7,8-dihydro-6-(1-pyrrolidinyl)-6,14 - endoethenocodide hydrochloride (143 mg.), M.P. 219–221° C. dec.

EXAMPLE 38

*Preparation of 7-benzoyl-7,8-dihydro-6-(1-pyrrolidinyl)-6,14-endoethenocodide*

6,8-bis-(1-pyrrolidinyl)-$\Delta^6$-codide methanolate (1.5 g.) is heated under reflux in phenyl vinyl ketone (1.5 g.) and benzene (5 ml.) for 2 hours. The solvent is then removed by evaporation, and the residue is collected with the aid of methanol and crystallized from methylene chloride-acetone to give 7-benzoyl-7,8-dihydro-6-(1-pyrrolidinyl)-6,14-endoethenocodide (600 mg.), melting point 182–183° C. dec. This product is a mixture of isomers as indicated by the nuclear magnetic resonance spectrum. It contains isomeric compounds which are epimeric at C–7.

EXAMPLE 39

*Preparation of 7-acetyl-7,8-dihydro-6-(1-pyrrolidinyl)-6,14-endoethenocodide*

A mixture of 500 mg. of 6,8-bis(1-pyrrolidinyl)-$\Delta^6$-codide methanolate and 5 ml. of methyl vinyl ketone is heated under reflux for about 20 hours. The reaction mixture is evaporated under reduced pressure, the residue is dissolved in methylene chloride, the solution is treated with charcoal, filtered and evaporated again. This residue is dissolved in 10 ml. of 5% HCl, and the solution is neutralized with aqueous sodium bicarbonate, whereupon the crude product (228 mg.) is precipitated, collected, and dried.

EXAMPLE 40

*Preparation of 7-acetyl-7,8-dihydro-6-(1-pyrrolidinyl)-6,14-endoethenocodide*

A solution of 6-demethoxy-6-(1-pyrrolidinyl)thebaine (1.7 g.) and methyl vinyl ketone (0.72 ml., 2 equivalents) in anhydrous benzene (100 ml.) is heated under reflux for 15 hours. The solvent is removed, and the resulting oil is dissolved in dilute hydrochloric acid (25 ml., 5%); the resulting solution is neutralized with aqueous sodium bicarbonate, and the white precipitate that forms is filtered and dried to give 7α-acetyl-7,8-dihydro-6-(1-pyrrolidinyl)-6,14-endoethenocodide (1.1 g.). When purified by recrystallization from ether-n-hexane this product melts at 104–107° C.

EXAMPLE 41

*Preparation of 7-cyano-7,8-dihydro-6-morpholino-6,14-endoethenocodide*

A solution of 6-demethoxy-6-morpholinothebaine (300 mg.) in acrylonitrile (5 ml.) is heated under reflux for three hours. Evaporation with the aid of benzene gives an oil which is dissolved in dilute hydrochloric acid (3 ml., 5%). Neutralization with aqueous sodium bicarbonate yields a solid which is filtered off and dried giving 7-cyano-7,8-dihydro-6-morpholino - 6,14-endoethenocodide (74 mg.) as a mixture of 7α- and 7β-epimers (as indicated by the nuclear magnetic resonance spectrum).

EXAMPLE 42

*Preparation of 7-carbethoxy-7,8-dihydro-6-morpholino-6,14-endoethenocodide*

A solution of 6-demethoxy-6-morpholinothebaine (ca. 300 mg.) in ethyl acrylate (5 ml.) is heated on the steam bath for three hours. Evaporation with the aid of benzene gives an oil which is dissolved in dilute hydrochloric acid (3 ml., 5%). Neutralization with aqueous sodium bicarbonate yields a solid which is filtered off and dried giving crude 7α-carbethoxy-7,8-dihydro-6-morpholino-6,14-endoethenocodide as an amorphous solid (80 mg.).

EXAMPLE 43

*Preparation of 7-cyclohexanecarbonyl-7,8-dihydro-6-(1-pyrrolidinyl)-6,14-endoethenocodide*

The general procedure of Example 40 is repeated. 6-demethoxy-6-(1-pyrrolidinyl)thebaine is heated with cyclohexyl vinyl ketone in anhydrous benzene, the product is isolated, and 7-cyclohexanecarbonyl-7,8-dihydro-6-(1-pyrrolidinyl)-6,14-endoethenocodide is thereby obtained.

EXAMPLE 44

*Preparation of 7-carbethoxy-7,8-dihydro-6-(1-pyrrolidinyl)-6,14-endoethenomorphide*

The general procedure of Example 34 is repeated. 6-demethoxy-6-(1-pyrrolidinyl)oripavine is heated with an excess of ethyl acrylate, the product is isolated, and 7-carbethoxy-7,8-dihydro-6-(1 - pyrrolidinyl) - 6,14-endoethenomorphide is thereby obtained.

EXAMPLE 45

*Preparation of 7-benzoyl-7,8-dihydro-6-(1-pyrrolidinyl)-6,14-endoethenomorphide*

The general procedure of Example 40 is repeated. 6-demethoxy-6-(1-pyrrolidinyl)oripavine is heated with phenyl vinyl ketone in anhydrous benzene, the product is isolated, and 7-benzoyl-7,8-dihydro-6-(1-pyrrolidinyl)-6,14-endoethenomorphide is thereby obtained.

EXAMPLE 46

*Preparation of 7-acetyl-7,8-dihydro-6-(1-pyrrolidinyl)-6,14-endoethenomorphide*

The general procedure of Example 40 is repeated. 6-demethoxy-6-(1-pyrrolidinyl)oripavine is heated with an excess of methyl vinyl ketone, the product is isolated, and 7-acetyl-7,8-dihydro-6-(1 - pyrrolidinyl) - 6,14-endoethenomorphide is thereby obtained.

EXAMPLE 47

*Preparation of 7-acetyl-N-allyl-7,8-dihydro-6-(1-pyrrolidinyl)-6,14-endoethenonorcodide*

The general procedure of Example 40 is repeated. N-allyl-6-demethoxy-6-(1 - pyrrolidinyl) - northebaine is heated with an excess of methyl vinyl ketone, the product is isolated, and 7-acetyl-N - allyl - 7,8 - dihydro-6-(1-pyrrolidinyl)-6,14-endoethenonorcodide is thereby obtained.

EXAMPLE 48

*Preparation of 7-acetyl-N-cyclopropylmethyl-7,8-dihydro-6-(1-pyrrolidinyl)-6,14-endoethenonorcodide*

The general procedure of Example 40 is repeated. N-cyclopropylmethyl - 6 - demethoxy - 6 - (1-pyrrolidinyl)-northebaine is heated with an excess of methyl vinyl ketone, the product is isolated, and 7-acetyl-N-cyclopropylmethyl-7,8-dihydro-6-(1 - pyrrolidinyl) - 6,14 - endoethenonorcodide is thereby obtained.

EXAMPLE 49

*Preparation of 7-acetyl-N-cyano-7,8-dihydro-6-(1-pyrrolidinyl)-6,14-endoethenonorcodide*

The general procedure of Example 40 is repeated. N-cyano-6-demethoxy-6-(1-pyrrolidinyl)northebaine is heated with an excess of methyl vinyl ketone, the product is isolated, and 7-acetyl-N-cyano-7,8-dihydro-6-(1-pyrrolidinyl)-6,14-endoethenonorcodide is thereby obtained.

EXAMPLE 50

*Preparation of 7-carbethoxy-7,8-dihydro-6-piperidino-6,14-endoethenocodide*

The general procedure of Example 42 is repeated. 6-demethoxy-6-piperindothebaine is heated with an excess of ethyl acrylate, the product is isolated, and 7-carbethoxy - 7,8 - dihydro-6-piperidino-6,14-endoethenocodide is thereby obtained.

EXAMPLE 51

*Preparation of 7-carbethoxy-7,8-dihydro-6-dimethylamino-6,14-endoethenocodide*

The general procedure of Example 42 is repeated. 6-demethoxy-6-dimethylaminothebaine is heated with an excess of ethyl acrylate, the product is isolated, and 7-carbethoxy - 7,8 - dihydro-6-dimethylamino-6,14,-endoethenocidide is thereby obtained.

EXAMPLE 52

*Preparation of 6,8-bis-(1-pyrrolidinyl)-$\Delta^6$-codide methanolate*

Pyrrolidine (4 ml.) is added slowly with stirring to a suspension of codeinone (4 g.) in hot methanol (40 ml.) under nitrogen. The reaction mixture is then allowed to cool to room temperature during which time the product crystallizes. The mixture is then kept at 0–5° C. for 1–2 hours. The crystalline product is collected, washed with methanol, and air-dried to give 6,8-bis-(1-pyrrolidinyl)-$\Delta^6$-codide methanolate (3.57 g.), M.P. 112–114° C. dec. A freshly prepared sample shows infrared absorption at 6.15 microns (in chloroform solution), and the nuclear magnetic resonance spectrum shows the pattern characteristic for one olefinic proton (at C–7).

*Analysis.*—Calcd. for $C_{27}H_{39}N_3O_3$: C, 71.49; H, 8.67; N, 9.26. Found: C, 71.38; H, 8.81; N. 9.25.

EXAMPLE 53

*Preparation of 6-demethoxy-6-(1-pyrrolidinyl)thebaine*

A solution of 6,8-bis-(1-pyrrolidinyl)-$\Delta^6$-codide (245 mg.) in anhydrous benzene (25 ml.) is heated under reflux for four hours. Solvent is removed, giving an oil which is crystallized by trituration with ether. Collection with n-hexane affords product (112 mg.), M.P. 117–120° C. which is recrystallized from n-hexane giving 6-demethoxy-6-(1-pyrrolidinyl)thebaine having M.P. 120–123° C., infrared absorption at 6.38$\mu$, and ultraviolet absorption at $\lambda_{max}$. 338 m$\mu$, $\epsilon$=9650. The nuclear magnetic resonance spectrum supports the structure and shows specifically two olefinic protons (at C–7 and C–8).

*Analysis.*—Calcd. for $C_{22}H_{26}N_2O_2$ (350.44): C, 75.40; H, 7.48; N, 7.99. Found: C, 75.79; H, 7.57; N, 7.92.

EXAMPLE 54

*Preparation of 6-demethoxy-6-(1-pyrrolidinyl)thebaine*

Pyrrolidine (1 ml.) is added slowly with stirring to a suspension of codeinone (1 g.) in hot methanol (10 ml.) under nitrogen. The reaction mixture is allowed to stand for about one hour, and then solvent is removed. The result is heated under reflux in benzene for four hours. Solvent is removed giving an oil which is crystallized by trituration with ether. Collection with n-hexane gives 6-demethoxy-6-(1-pyrrolidinyl)thebaine.

EXAMPLE 55

*Preparation of 6-demethoxy-6-morpholinothebaine*

A mixture of codeinone (200 mg.), morpholine (1 ml.) and methanol (10 ml.) is heated in an autoclave at a temperature of from 100° C. to 105° C. for 18 hours. Evaporation of the result with the aid of benzene gives an oil. This oil is heated under reflux in benzene (10 ml.) for four hours, and solvent is removed giving 6-demethoxy-6-morpholinothebaine as an oil with infrared absorption at 6.33$\mu$. The nuclear magnetic resonance spectrum of this oil supports the structure and shows two olefinic protons (at C–7 and C–8).

EXAMPLE 56

*Preparation of 6-demethoxy-6-morpholinothebaine*

A solution of codeinone (500 mg.), morpholine (1.5 ml.), and n-butanol (25 ml.) is heated under reflux for 16 hours. Evaporation of solvent gives an oil. This oil is heated under reflux in benzene for four hours, and solvent is removed giving 6-demethoxy-6-morpholinothebaine.

EXAMPLE 57

*Preparation of 6-demethoxy-6-(1-pyrrolidinyl)oripavine*

The general procedure of Example 54 is repeated. By treatment of morphinone with an excess of pyrrolidine, followed by conversion to the dienamine, 6-demethoxy-6-(1-pyrrolidinyl)oripavine is thereby obtained.

EXAMPLE 58

*Preparation of N-cyano-6-demethoxy-6-(1-pyrrolidinyl)northebaine*

By following the procedure of Example 54 except that an equivalent amount of N-cyanonorcodeinone is used in place of the codeinone of that example, there is obtained N-cyano-6-demethoxy-6-(1-pyrrolidinyl)northebaine.

EXAMPLE 59

*Preparation of N-allyl-6-demethoxy-6-(1-pyrrolidinyl)northebaine*

The general procedure of Example 54 is repeated. By treatment of N-allylnorcodeinone with an excess of pyrrolidine, followed by conversion to the dienamine, N-allyl-6-demethoxy-6-(1-pyrrolidinyl)northebaine is thereby obtained.

EXAMPLE 60

*Preparation of N-cyclopropylmethyl-6-demethoxy-6-(1-pyrrolidinyl)northebaine*

The general procedure of example 54 is repeated. By treatment of N-cyclopropylmethylnorcodeinone with an excess of pyrrolidine, followed by conversion to the dienamine, N - cyclopropylmethyl-6-demethoxy-6-(1-pyrrolidinyl)northebaine is thereby obtained.

EXAMPLE 61

*Preparation of 6-demethoxy-6-piperidinothebaine*

By following the procedure of Example 56 except that an equivalent amount of piperidine is used in place of the morpholine of that example, there is obtained 6-demethoxy-6-piperidinothebaine.

EXAMPLE 62

*Preparation of 6-demethoxy-6-dimethylaminothebaine*

By following the procedure of Example 55 except that an equivalent amount of dimethylamine is used in place of the morpholine of that example, there is obtained 6-demethoxy-6-dimethylaminothebaine.

What is claimed is:

1. A compound selected from the group consisting of those of the formula:

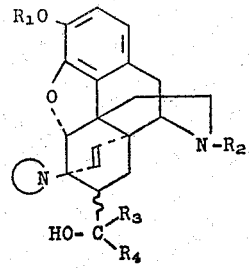

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; ⟩N— is selected from the group consisting of pyrrolidinyl, piperidino, morpholino and di-(lower alkyl) amino; and $R_3$ and $R_4$ are the same or different and are each selected from the group consisting of hydrogen, lower alkyl, phenyl, lower cycloalkyl and phenyl lower alkyl; the non-toxic pharmaceutically acceptable acid-addition salts thereof; and the alkali metal phenolates thereof when $R_1$ is hydrogen.

2. A compound according to claim 1 in which $R_1$ and $R_2$ are methyl, $R_3$ and $R_4$ are hydrogen and ⟩N— is 1-pyrrolidinyl.

3. A compound according to claim 1 in which $R_1$ and $R_2$ are methyl, $R_3$ is hydrogen, $R_4$ is phenyl and ⟩N— is 1-pyrrolidinyl.

4. A compound according to claim 1 in which $R_1$, $R_2$ and $R_3$ are methyl, $R_4$ is phenyl and ⟩N— is 1-pyrrolidinyl.

5. A compound according to claim 1 in which $R_1$, $R_2$ and $R_3$ are methyl, $R_4$ is n-propyl and ⟨N— is 1-pyrrolidinyl.

6. A compound according to claim 1 in which $R_1$, $R_2$, $R_3$ and $R_4$ are methyl and ⟨N— is 1-pyrrolidinyl.

7. A compound according to claim 1 in which $R_1$ is hydrogen, $R_2$, $R_3$ and $R_4$ are methyl and ⟨N— is 1-pyrrolidinyl.

8. A compound according to claim 1 in which $R_1$, $R_2$, $R_3$ and $R_4$ are methyl and ⟨N— is morpholino.

9. The process of preparing compounds of the formula:

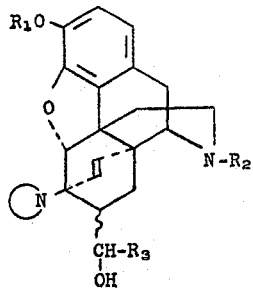

wherein $R_1$ is selected from the group consisting of hydrogen, lower alkyl and lower alkanoyl, $R_2$ is selected from the group consisting of hydrogen, cyano, propargyl, lower alkyl, phenyl lower alkyl, lower alkenyl and lower cycloalkylmethyl, $R_3$ is selected from the group consisting of hydrogen, lower alkyl, lower cycloalkyl, phenyl and phenyl lower alkyl, and ⟨N— is selected from the group consisting of pyrrolidinyl, piperidino, morpholino, and di(lower alkyl)amino; which comprises contacting a compound of the formula:

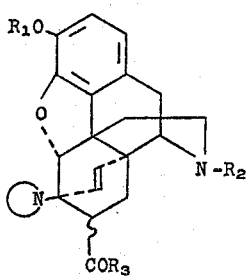

wherein $R_1$, $R_2$, $R_3$ and ⟨N— are as hereinabove defined with a reducing agent selected from the group consisting of lithium aluminum hydride and sodium borohydride, in a solvent inert to the reactants at a temperature of from about 0° C. to about 65° C.

10. The process of preparing compounds of the formula:

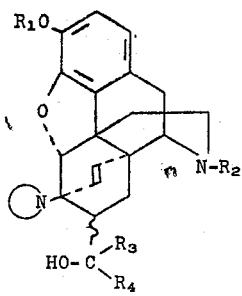

wherein $R_1$ is selected from the group consisting of hydrogen, lower alkyl and lower alkanoyl, $R_2$ is selected from the group consisting of hydrogen, cyano, propargyl, lower alkyl, phenyl lower alkyl, lower alkenyl and lower cycloalkylmethyl, ⟨N— is selected from the group consisting of pyrrolidinyl, piperidino, morpholino and di(lower alkyl)amino, $R_3$ is selected from the group consisting of hydrogen, lower alkyl, lower cycloalkyl, phenyl and phenyl lower alkyl, and $R_4$ is selected from the group consisting of lower alkyl, lower cycloalkyl, phenyl and phenyl lower alkyl; which comprises contacting a compound of the formula:

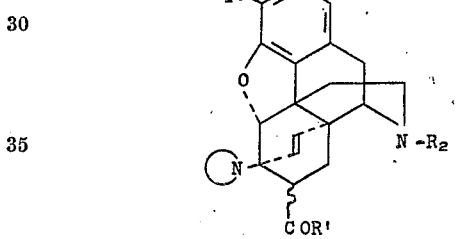

wherein $R_1$, $R_2$ and ⟨N— are as hereinabove defined, and R' is selected from the group consisting of hydrogen, lower alkyl, lower alkoxy, lower cycloalkyl, phenyl and phenyl lower alkyl with an organo-metal reagent of the formula:

$$R_4-M$$

wherein $R_4$ is as hereinabove defined and M is selected from the group consisting of lithium, magnesiochloride, magnesiobromide and magnesioiodide, in a solvent inert to the reactants at a temperature of from about 0° C. to about 80° C.

References Cited by the Examiner

UNITED STATES PATENTS 2,510,732   6/1950   Homeyer _____ 260—285

FOREIGN PATENTS 937,214   9/1963   Great Britain.

OTHER REFERENCES

Janssen: J. Am. Chem. Soc., vol. 78, p. 3862 (1956).
Fieser et al.: Adv. Organic Chemistry, Reinhold, 1951, pp. 270, 279–280 and 498–9.

ALEX MAZEL, *Primary Examiner.*

DONALD G. DAUS, *Assistant Examiner.*